(12) United States Patent
Lian

(10) Patent No.: US 10,956,809 B1
(45) Date of Patent: Mar. 23, 2021

(54) ARTIFICIAL INTELLIGENCE BRAIN

(71) Applicant: Wang Lian, Singapore (SG)

(72) Inventor: Wang Lian, Singapore (SG)

( * ) Notice: Subject to any disclaimer, the term of this patent is extended or adjusted under 35 U.S.C. 154(b) by 0 days.

(21) Appl. No.: 17/089,536

(22) Filed: Nov. 4, 2020

(30) Foreign Application Priority Data

Nov. 21, 2019 (SG) .............................. 10201910949P

(51) Int. Cl.
*G06N 3/04* (2006.01)
*G06N 3/08* (2006.01)

(52) U.S. Cl.
CPC ............. *G06N 3/0454* (2013.01); *G06N 3/08* (2013.01)

(58) Field of Classification Search
CPC ............................... G06N 3/08; G06N 3/0454
See application file for complete search history.

(56) References Cited

U.S. PATENT DOCUMENTS

2019/0156203 A1    5/2019    Kang et al.

FOREIGN PATENT DOCUMENTS

| CN | 100495032 C | 6/2009 |
| CN | 107045720 A | 8/2017 |
| CN | 109171769 A | 1/2019 |

OTHER PUBLICATIONS

Corradi "Integrating visual and tactile robotic perception" at https://researchportal.bath.ac.uk/en/studentTheses/integrating-visual-andtactile-robotic-perception (Feb. 2018).
Hong/IPOS "Search Report" for priority application SG 10201910949P (dated Dec. 2019).
Hong/IPOS "Written Opinion" for priority application SG 10201910949P (dated Dec. 2019).
Hong/IPOS "Written Opinion" for priority application SG 10201910949P (dated Mar. 2020).
See/Yu/Lee "Response to the Written Opinion" for priority application SG 10201910949P (dated Apr. 2020).
Hong/IPOS "Examination Report" for priority application SG 10201910949P (dated Sep. 2020).

*Primary Examiner* — Stanley K. Hill
(74) *Attorney, Agent, or Firm* — Studebaker & Brackett PC

(57) ABSTRACT

A computer-implemented method of generating a response based on a physical signal, a non-transitory memory and a system to implement the method is described. The method includes detecting a physical signal by an image sensor and a sound sensor; processing the detected physical signal by a corresponding first deep neural network; storing the processed signal as processed data in individual corresponding memory units; connecting the individual corresponding memory units with a second deep neural network to form one or more cognition units; generating, by the one more cognitions units, an expression, from a signal produced by the second deep neural network; and converting, by a third deep neural network, the expression into an output for an output device.

9 Claims, 4 Drawing Sheets

ARTIFICIAL INTELLIGENCE BRAIN

The present invention relates to a device, system and/or method to produce an artificial intelligence brain.

Human beings are known to have five senses—mainly sight, sound, touch, smell and taste. Existing efforts to build a machine which can replicate the senses generally focuses on one aspect and are inadequate to build a device or system that can replicate a human being, in particular the thinking process to generate an output in response to an input.

In a first aspect, there is provided a computer-implemented method of generating a response based on a physical signal, the method comprises (a) detecting a physical signal by an image sensor and a sound sensor;

(b) processing the detected physical signal by a corresponding first deep neural network;

(c) storing the processed signal as processed data in individual corresponding memory units;

(d) connecting the individual corresponding memory units with a second deep neural network to form one or more cognition units;

(e) generating, by the one more cognitions units, an expression, from a signal produced by the second deep neural network; and (f) converting, by a third deep neural network, the expression into an output for an output device.

Preferably, the method further comprises detecting the physical signal with one or more additional sensors selected from: a touch sensor, a smell sensor, and a taste sensor; and processing the physical signal.

Preferably, the method further comprises detecting the physical signal with one or more additional sensors selected from: an infrared sensor, an ultraviolet sensor, an ultrasonic sensor, an infrasonic sensor, a magnetic field sensor, a gravity sensor, a temperature sensor, a humidity sensor, an air pressure sensor, and a cosmic radiation sensor; and processing the physical signal In an embodiment, the output is in the form of an oral language or a written language.

In a second aspect, there is provided a non-transitory machine readable medium comprising instructions stored therein and executable by one or more processors to perform the method according to the first aspect.

In a third aspect, there is provided a system comprising: a plurality of sensors comprising an image sensor and a sound sensor; a plurality of first deep neural networks communicably coupled to the sensors respectively; at least one cognition unit comprising a plurality of memory units and a second deep neural network communicably coupled to the plurality of memory units, wherein the memory units are configured to store sensor data sets from the first deep neural networks respectively, and the at least one cognition unit is configured to generate an expression from a signal produced by the second deep neural network; a third deep neural network configured to convert the expression into an output; and an output device to deliver the output.

Preferably, the system further comprises one or more additional sensors selected from: touch sensor, a smell sensor, a taste sensor, an infrared sensor, an ultraviolet sensor, an ultrasonic sensor, an infrasonic sensor, a magnetic field sensor, a gravity sensor, a temperature sensor, a humidity sensor, an air pressure sensor, and a cosmic radiation sensor.

In an embodiment, the output device is configured to deliver the output in the form of an oral language or a written language.

Figure 1:
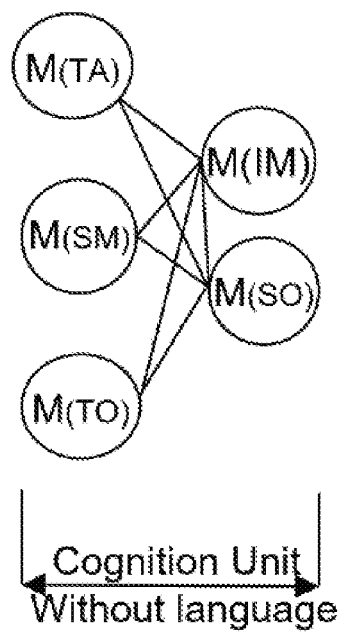
FIG. 1 shows an example of a cognition unit without language.

In the following description, numerous specific details are set forth in order to provide a thorough understanding of various illustrative embodiments of the invention. It will be understood, however, to one skilled in the art, that embodiments of the invention may be practiced without some or all of these specific details. Embodiments described in the context of one of the methods or devices are analogously valid for the other methods or devices. Similarly, embodiments described in the context of a method are analogously valid for a device, and vice versa.

Unless defined otherwise, all technical and scientific terms used herein have the meaning commonly understood by a person skilled in the art to which this invention belongs.

Deep learning neural networks may be used to convert sensory inputs like image of an object, sound, temperature, odours, taste etc., into the form of algorithms and allow a device to recognise what a human being perceives through the senses. This may also extend to other animals and not just human beings.

The nature of cognition is grouped sensory experiences (perceptions sets). Language, sign and logic are only by-product of cognition. A typical cognition may be formed from images plus sound and other smaller or less important features captured by touch, smell and taste. At least two sensors to acquire images and sound may be required to perceive the physical signals. Additional sensors may be further provided for touch, smell and taste. The term "sensor" includes both a single physical sensor and multiple sensors working individually and/or in tandem, for example in an array.

In an example, the following sensors may be used:

S(IM)—Sensor to perceive an image, for example a camera. Deep learning methods may be used to allow a machine to receive an image from the image sensor and determine an object/s in the image, by segmenting the image and recognising an object from the image, for example a face, nose, people, cat, tree etc. The sensor may be used for both still images and moving images (i.e. a video).

S(SO)—Sensor to perceive sound, for example a microphone. The sound sensor may be able to capture frequency, or its inverse, wavelength, amplitude, sound pressure or intensity, speed of sound, direction and so on. Deep learning may be used on the data from the sound sensors in speech recognition.

S(TO)—Sensor to perceive touch, for example a capacitive touch sensor. The touch sensor may be able to determine various conditions of a surface touching (i.e. contacting) the sensor or being proximal to the sensor, for example the temperature, hardness (rigidity or flexibility) of the surface, smoothness of the surface, force exerted by the surface on the sensor etc. The surface may be a person or an object or a part of either.

S(SM)—Sensor to perceive smell or odours, for example an electronic nose (e-nose). An electronic nose is a device that identifies chemical compounds that may be attributed to a particular smell or odour in the air or atmosphere.

S(TA)—Sensor to perceive taste, for example an electronic tongue. An electronic tongue is a device that identifies chemical compounds that may be attributed to a particular flavour in a liquid and/or solid. Examples of the flavour include sweetness, sourness, saltiness, bitterness and umami etc.

In an example, each type or set of signals from the various sensors are processed by a deep learning method, for example a deep neural network, and/or convolutional neural network. Thus, there may be five convolutional neural networks as follow:

N(IM)—Convolutional (or other deep learning) neutral network to process signals from the image sensor;

N(SO)—Convolutional (or other deep learning) neutral network to process signals from the sound sensor;

N(TO)—Convolutional (or other deep learning) neutral network to process signals from the touch sensor;

N(SM)—Convolutional (or other deep learning) neutral network to process signals from the smell sensor;

N(TA)—Convolutional (or other deep learning) neutral network to process signals from the taste sensor.

Each sensor works with an individual sensory deep learning neural network (DNN) to process the signals or data. Each sensory deep neural network is trained to segment and discriminate the physical signal from each individual sensor. A deep neural network may be made of an input layer, an output layer, and a number of intermediate layers between the input and output layers. Generally, each layer is made up of one or more nodes. In the input and output layer, each node contains the input and output variables respectively. The nodes in the output layer may perform calculations as well if desired. In the intermediate layer, each node combines variables from the node/s in the preceding layer (the input layer or a preceding layer) with weights (assigned on the basis of its relative importance to the other input variables) that either amplify or dampen the input variable, and provides a weighted value for the input variable. The weighted values may be summed and further evaluated to determine if the input from each node should progress to the next layer, and the significance attached to the evaluated feature. Each node and/or layer evaluates a particular aspect of the previous layer be it the input layer or preceding intermediate layer. Each node and/or layer may utilise a linear and/or non-linear function to convert the input to an output for the next layer. When there are more than one intermediate layer, the output from the first intermediate layer becomes the input for the second intermediate layer and so forth, until it reaches the output layer. By passing the signals through multiple layers, complex signals or data may be broken down and processed.

In an example, convolutional neural networks may be used. A convolutional neural network has at least one convolution layer. Each node in the convolution layer receives its input from multiple nodes from the preceding layer which together creates a proximity and share their weights (many-to-one mapping). Thus, the convolution layer reduces the number of parameters worked on in the node. This may be considered as applying a filter or set of filters to the preceding layer to select the proximal nodes.

After the processing by the sensory deep neural network:

1) Image signals are segmented and discriminated to objects like face, nose, arm, people, cat, car, tree, window, building, river and so on.

2) Sound signals are segmented and discriminated to human oral language, sound of rain, sound of wind, sound of car and so on.

3) Touch signals are captured and discriminated to temperature, hardness, smoothness and so on.

4) Smell signals are segmented and discriminated to different odours like musky (perfumes/aftershave), putrid (rotten eggs), pungent (vinegar), camphoraceous (mothballs), ethereal (dry cleaning fluid), floral (roses), peppermint (mint gum) and so on.

5) Taste signals are segmented and discriminated to taste of sweetness, sourness, saltiness, bitterness, umami and so on.

As an example, the TensorFlow open source platform may be used to create the machine learning models, in particular the deep neural networks. In another example, the Parrots deep learning platform may be used.

The processed signals may be stored in a specified area:

M(IM)—Memory of processed Image signals

M(SO)—Memory of processed Sound signals

M(TO)—Memory of processed Touch signals

M(SM)—Memory of processed Smell signals

M(TA)—Memory of processed Taste signals

A cognitive deep learning neural network—N(C)—may be built to connect the processed memory M(IM), M(SO), M(TO), M(SM) and M(TA) to form one or more cognition units which may be named C(1, 2, 3 . . . n).

FIG. 1 shows an example of a cognition unit that may be built without oral and written language. The cognitive deep learning neural network, for example a convoluted neural network to convert the processed signals to form a set of memory, those memories connect together became cognition unit.

All those M connected and became memory set/sets, we name it cognition unit/units. Like the table shown below the cognition unit of Woman—C(woman), the whole combination of M(IM)—her face, hair, body . . . ; M(SO)—Gentle voice . . . ; M(TO)—Warm, soft embrace . . . ; M(SM)—Unique body flavour . . . and M(TA)—Sweet milk . . . joint together become the cognition of Woman.

Figure 2:
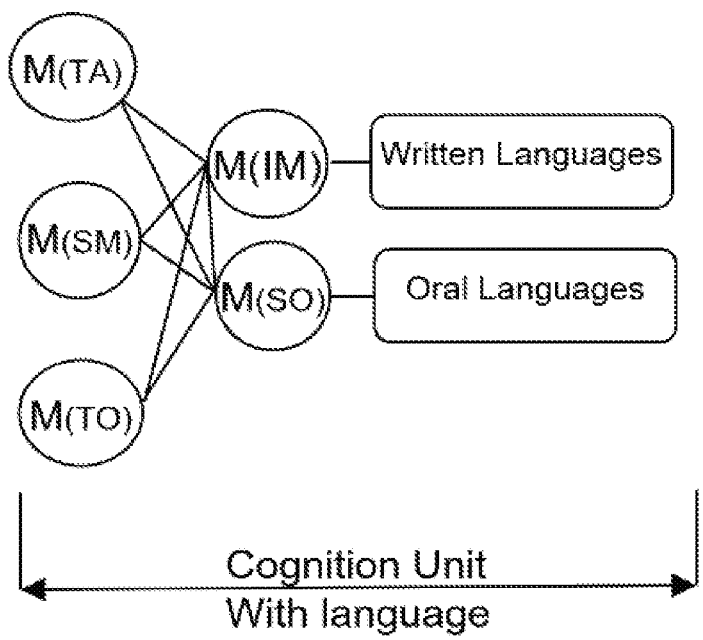
FIG. 2 shows an example of a cognition unit with language.

FIG. 2 shows an example of a cognition unit with oral and written language. In this embodiment, the expression output is converted into a format which is understandable to humans, i.e. a written or oral language. A written language may be considered an image in the form of an algorithm, while an oral language may be considered as sound in the form of an algorithm, regardless of the specific language.

An example of a cognition unit of a woman is provided in the table below:

| Cognition unit | Type of Memory | The Set of Perceptions Represent woman |
|---|---|---|
| Woman | $M_{(IM)}$ | Face, hair, body . . . |
|  | $M_{(SO)}$ | Gentle voice . . . |
|  | $M_{(TO)}$ | Warm, soft embrace . . . |
|  | $M_{(SM)}$ | Unique body flavour . . . |
|  | $M_{(TA)}$ | Sweet milk . . . |

An expression deep learning neural network, N(E), may be built to provide the expression and chose the suitable language, sentence, wording and logic output provided via a speaker and a screen (or display). The expression deep learning neural network is trained to master the expression of the content already present in the cognition unit. In other words, the expression deep learning neural network converts the output from the cognition unit to the expression to allow it to be understood by a person.

The expression deep learning neural network is trained to master the skill of expression, and the written language and oral language is the physical output signal that may be perceived by a person.

Figure 3:
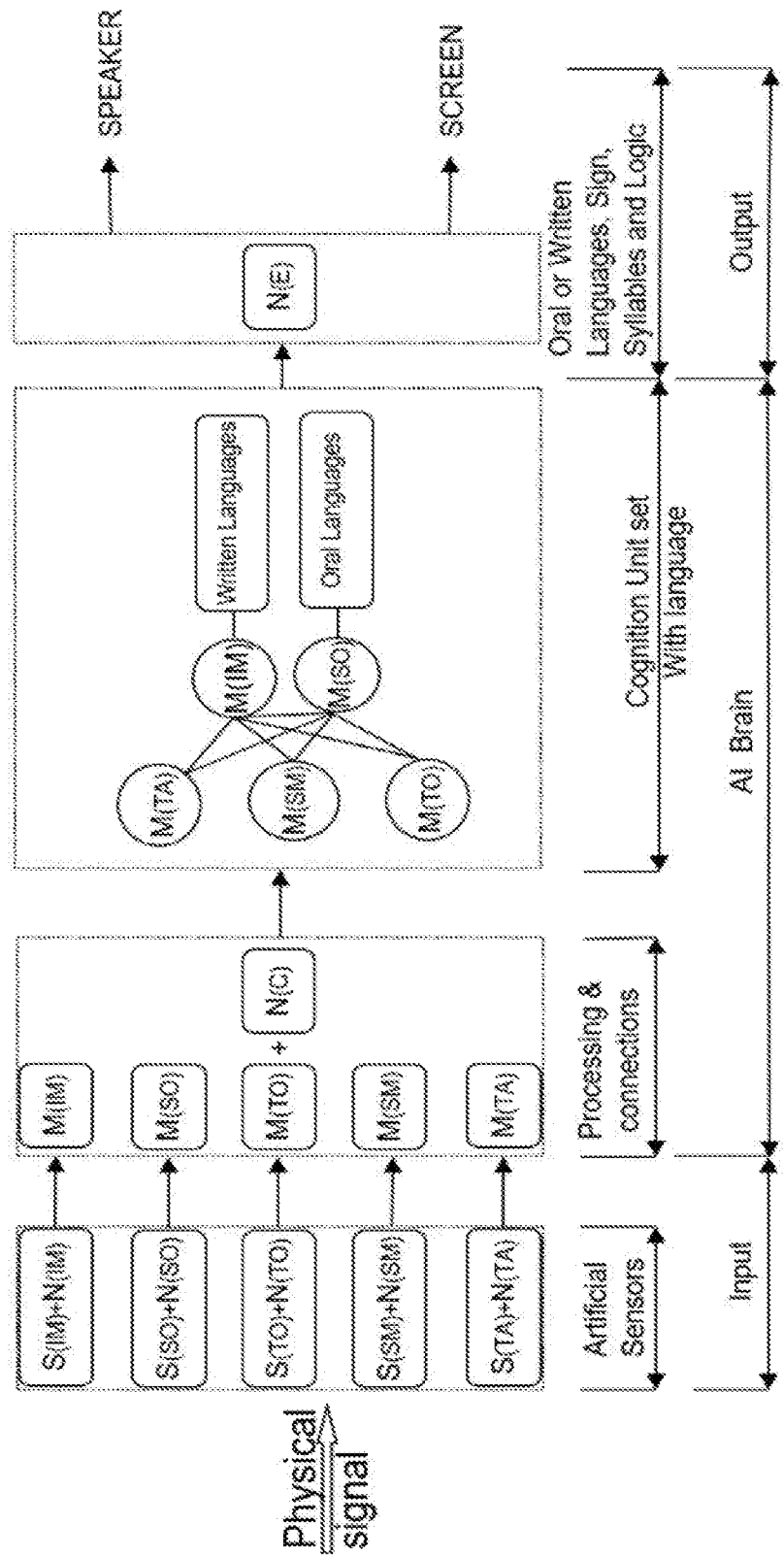
FIG. 3 shows a schematic view of an embodiment of the invention.

FIG. 3 shows a schematic diagram of an example utilising an Artificial Intelligence (AI) Brain. The physical signal is detected by one or more of the sensors and processed by the sensory deep neural network associated with the individual sensor/s. A first deep neural network (sensory deep neural network) is trained to segment and discriminate the physical signal. The processed data is stored in the memory units. A second deep neural network (cognitive deep neural network, N(C)) is trained to connect the memory units, and form one or more cognition units. The cognition unit generates an expression from the sensor signals based on the second deep neural network. A third deep neural network (expression deep neural network) is trained to master the expression from the cognition units and convert it into a suitable format (an output) recognisable by human beings, for example oral language (speech), written language, sign language, syllables and logic. Logic here refers to the format of expression, the sequence of wording in the language etc. Output devices like a speaker and/or a screen (or display) may be used to show the output in a format that may be recognised by human beings.

Human beings are known to have five kind of senses and the physical signals perceived are limited. Other types of sensors that may be used as extended or enhanced sensors of these five senses include infrared, ultraviolet, ultrasonic, infrasonic, odour arising from an illness like cancer, odour of any substance and so on. In addition, other possible sensors include those that can detect and measure magnetism, gravity, temperature, humidity, air pressure, cosmic radiation and so on.

Other than human beings, the examples and embodiments described herein may be employed for other animals as well, for example a dog.

The AI brain, sensors and output devices may be used as part of a robotic device.

The AI brain described may be able to perceive physical signals, but does not have feelings. A goal or objective may be provided in the cognition unit or AI brain, e.g. to survive as long as possible, to duplicate as many as possible or to protect mankind. With the goal set in the AI Brain, the robot is able to better replicate human emotions and be in a position to love, hate and scare. Thus, the AI brain may have a positive or negative feeling on an individual event.

Translation Solution

Human beings are able to generate a cognition set before the advent of a common language, and human beings can communicate by other ways. For communications between cognition sets, language serves as a bridge connecting the cognition sets. Existing translation method is from language to language, but a better method may be communication from cognition to cognition.

Figure 4:
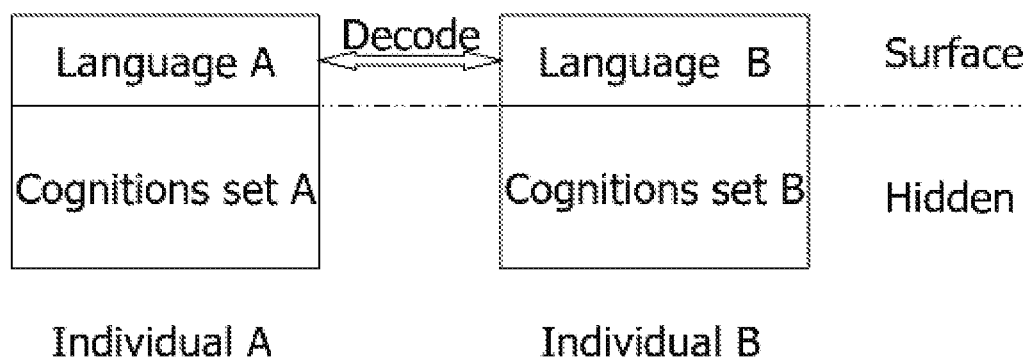
FIG. 4 shows a schematic view of communication between two individuals.

As shown in FIG. 4, in an example of a communication method, the method may include:

1) The Cognition Set A of Individual A instruct Language A what it wants to express;

2) The Language A chose suitable wording in a certain sequence, speed and tongue to speak to Cognition Set B 3) Cognition Set B of Individual B translate those wording to form pictures and sounds (plus supplementary information from touch smell and taste) in his mind.

4) Based on above mentioned pictures and sound in his mind, Cognition Set B instruct Language B chose suitable wording in certain sequence, speed and tongue and speak. Translation Solution is the key invention.

The human brain accommodate thousands of cognition units, and the full set of cognition units is equivalent to the brain itself. The communication between the individual is the communication between their cognition set. The language is only the bridge, or an agent in the communication. The current method of AI translation is entangled within the language itself which may not be suitable or adequate.

In an embodiment, the sensors, and memory units and nodes are separately located, and may form a system. The sensors may be used to monitor a plurality of locations remotely from a central location. The plurality of locations may contain one or more of the sensors, in particular the image sensor and sound sensor. This allows the AI Brain to see, hear and feel everything in multiple locations.

Figure 5:
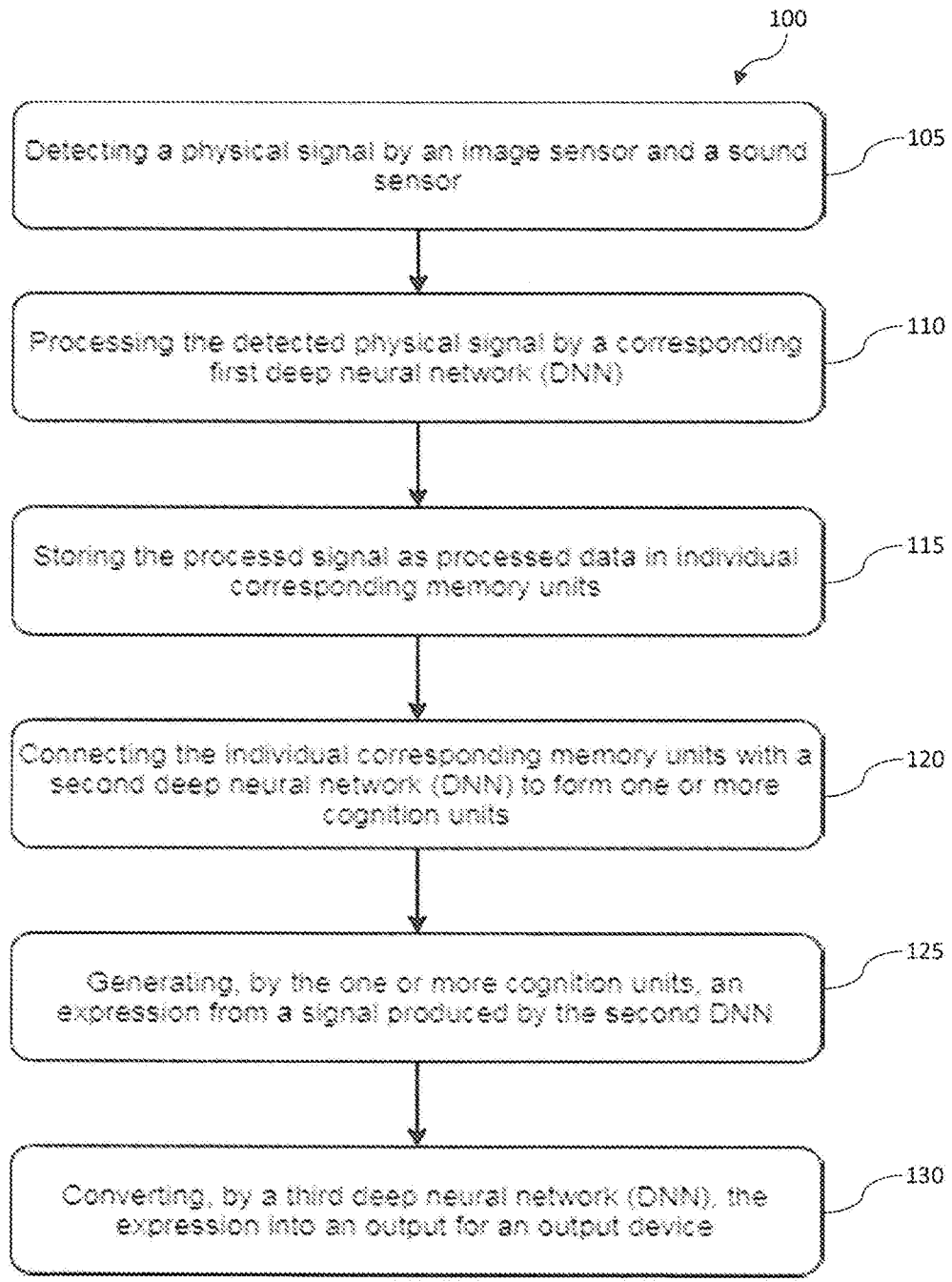
FIG. 5 shows an example of a method.

In an example, a method 100 of generating a response based on a physical signal is shown in FIG. 5, the method 100 includes:

At block 105, detecting the physical signal by an image sensor and a sound sensor;

At block 110, processing data from each of the image sensor and the sound sensor by a corresponding first deep neural network (sensory DNN);

At block 115, storing the processed data from each of the image sensor and the sound sensor in individual corresponding memory units; and At block 120, connecting the individual corresponding memory units with a second deep neural network (cognitive DNN) to form one or more cognition units;

At block 125, generating, by the one or more cognition units, an expression from a signal produced by second deep neural network.

The method 100 may further include, at block 130, converting, by a third deep neural network, the expression into an output for an output device.

The third deep neural network (expression DNN) controls and chooses suitable wording in certain sequence, speed and tongue from what the cognition units wants to express and speak (output). In another words, the third DNN is trained to master the expression, the content of which is already in the cognition unit, the third DNN only chose the format of expression.

One or more additional sensors may be provided to detect the physical signal, including a touch sensor, a smell sensor, and a taste sensor.

The systems and methods described above may be implemented in many different ways in many different combinations of hardware, software, firmware, or any combination thereof. In one example, the systems and methods may be implemented with a computer having a processor and a memory communicably coupled thereto, where the memory stores instructions which when executed by the processor, cause the processor to perform the aforementioned methods. The processor may include any type of circuit such as, but not limited to, a microprocessor, a microcontroller, a graphics processor, a digital signal processor, or another processor. The processor may also be implemented with discrete logic or components, or a combination of other types of analogue or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The invention claimed is:

1. A computer-implemented method of generating a response based on a physical signal, the method comprising:
   (a) detecting a physical signal by an image sensor and a sound sensor;
   (b) processing the detected physical signal by a corresponding first deep neural network;
   (c) storing the processed signal as processed data in individual corresponding memory units;
   (d) connecting the individual corresponding memory units with a second deep neural network to form one or more cognition units;
   (e) generating, by the one or more cognitions units, an expression, from a signal produced by the second deep neural network; and
   (f) converting, by a third deep neural network trained to master the expression, the expression into an output for an output device, wherein the third deep neural network controls and chooses suitable wording in a certain sequence, speed, and tongue to provide the output in the form of an oral language or a written language.

2. The computer-implemented method according to claim 1, further comprising detecting the physical signal with one or more additional sensors selected from the group consisting of: a touch sensor, a smell sensor, and a taste sensor; and processing the physical signal.

3. The computer-implemented method according to claim 2, further comprising detecting the physical signal with one or more additional sensors selected from the group consisting of: an infrared sensor, an ultraviolet sensor, an ultrasonic sensor, an infrasonic sensor, a magnetic field sensor, a gravity sensor, a temperature sensor, a humidity sensor, an air pressure sensor, and a cosmic radiation sensor; and processing the physical signal.

4. A non-transitory, machine readable medium comprising instructions stored therein and executable by one or more processors to perform a method of generating a response based on a physical signal, the method comprising:
   (a) detecting a physical signal by an image sensor and a sound sensor;
   (b) processing the detected physical signal by a corresponding first deep neural network;
   (c) storing the processed signal as processed data in individual corresponding memory units;
   (d) connecting the individual corresponding memory units with a second deep neural network to form one or more cognition units;
   (e) generating, by the one or more cognitions units, an expression, from a signal produced by the second deep neural network; and
   (f) converting, by a third deep neural network trained to master the expression, the expression into an output for an output device, wherein the third deep neural network controls and chooses suitable wording in a certain sequence, speed, and tongue to provide the output in the form of an oral language or a written language.

5. The non-transitory machine readable medium according to claim 4, wherein the method further comprises detecting the physical signal with one or more additional sensors selected from the group consisting of: a touch sensor, a smell sensor, and a taste sensor; and processing the physical signal.

6. The non-transitory machine readable medium according to claim 5, wherein the method further comprises detecting the physical signal with one or more additional sensors selected from the group consisting of: an infrared sensor, an ultraviolet sensor, an ultrasonic sensor, an infrasonic sensor, a magnetic field sensor, a gravity sensor, a temperature sensor, a humidity sensor, an air pressure sensor, and a cosmic radiation sensor; and processing the physical signal.

7. A system comprising:
   a plurality of sensors comprising an image sensor and a sound sensor;
   a plurality of first deep neural networks communicably coupled to the sensors respectively;
   at least one cognition unit comprising a plurality of memory units and a second deep neural network communicably coupled to the plurality of memory units, wherein the memory units are configured to store sensor data sets from the first deep neural networks respectively, and the at least one cognition unit is configured to generate an expression from a signal produced by the second deep neural network;
   a third deep neural network configured to convert the expression into an output, wherein the third deep neural network controls and chooses suitable wording in a certain sequence, speed, and tongue to provide the output in the form of an oral language or a written language; and
   an output device to deliver the output.

8. The system according to claim 7, further comprising one or more additional sensors selected from the group consisting of: touch sensor, a smell sensor, a taste sensor, an infrared sensor, an ultraviolet sensor, an ultrasonic sensor, an infrasonic sensor, a magnetic field sensor, a gravity sensor, a temperature sensor, a humidity sensor, an air pressure sensor, and a cosmic radiation sensor.

9. The system according to claim 7, wherein the output device is configured to deliver the output in the form of the oral language or the written language.

\* \* \* \* \*